Jan. 18, 1927.
G. CLEAVER
1,614,600
FLOATING FISH TRAP
Filed July 6, 1926
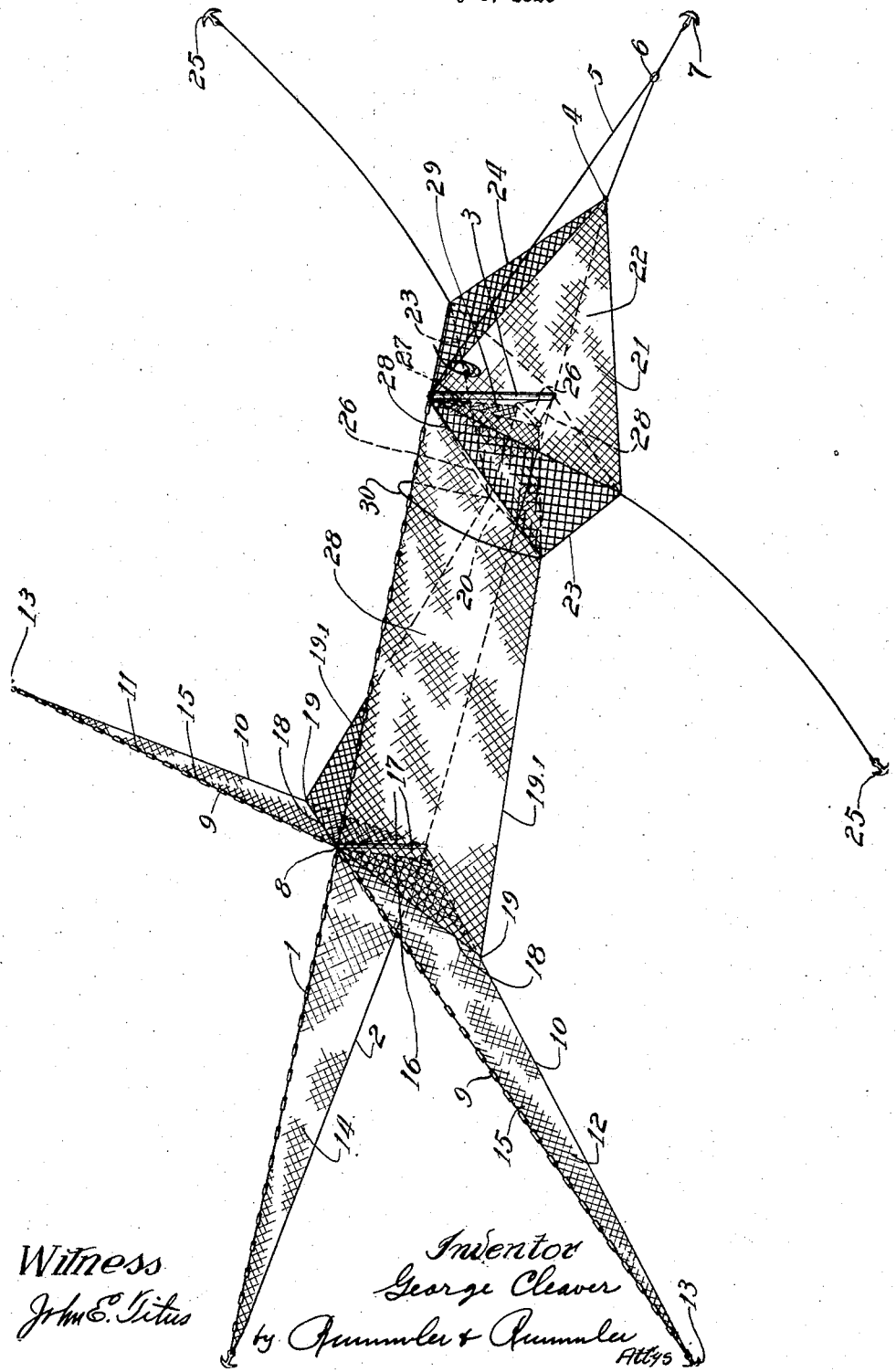

Patented Jan. 18, 1927.

1,614,600

UNITED STATES PATENT OFFICE.

GEORGE CLEAVER, OF CASEVILLE, MICHIGAN.

FLOATING FISH TRAP.

Application filed July 6, 1926. Serial No. 120,830.

This invention relates to improvements in floating fish traps, more especially those of the general type in which a lead net runs in a direction normal to the shore line and has side wing nets converging with the lead net and joining into a closed body portion, tunnel, or heart, at the rear of which is placed a pound or receiver from which the trapped fish may be removed.

The main objects of this invention are to provide a more simplified general construction; to provide a fish trap which is more easily handled; more secure when set; more efficient in operation; and which may be quickly emptied with a less amount of labor.

The structure is generally characterized by having substantially triangular shaped nets and cross chamber sections throughout, and also by having triangularly shaped trap apertures instead of the square openings. The netting panels which enclose the different sides of the trap are mainly triangular, and bounded on all three sides by ropes which take all strains directly, and no strains are placed on the net fabric. In rectangularly shaped net sections an accidental strain across the diagonally opposite corners places the strain directly on the net fabric, while in triangular shapes the binding ropes are always in direct line of the strains.

A preferred embodiment of this invention is shown in the accompanying drawing, in which is a perspective view of the fish trap in set position, with the wings and anchor lines substantially foreshortened for convenience in illustration.

The longitudinal or main lead of the trap is formed by netting between the upper rope line 1 and the lower parallel rope line 2. These lines are joined at the inner end and anchored near the shore. The lines extend outwardly from the shore and diverge vertically to the upright main spar 3, and then join at a point 4 beyond the main spar. The outer point 4 is stretched by the down-haul 5 which attaches to the outer point 4 and passes through the pulley block 6 of the anchor 7, and is then secured to a lock on the upper end of the spar 3. A throat-spar or spreader 8 is secured between the top and bottom lines 1 and 2 and spaces inwardly a distance from the main spar 3. The upper and lower wing lines 9 and 10, of the side wings 11 and 12, are secured to the upper and lower ends respectively of the spar 8, and join at the outer ends of the wings, which ends are fastened to the wing anchors 13. The main lead netting panel 14 and the wing net panels 15 are secured between said upper and lower lines of the lead and wings, the wing nets being terminated in the short stay-leads 16 which run from the top of the spar 8 to points on the lines 10 spaced a short distance away from the bottom of the spar. This forms the triangular trap openings 17 which are considered to be more efficient than the usual square openings, especially in preventing the fish from passing outwardly.

A second pair of stays 18 are run from the top of the spar 8 to points 19 a distance out on the bottom wing lines 10. The points 19 are each connected by rope lines 19.1 to the ends of the transverse marginal rope 20 of the pentagonally shaped bottom or base net 21 of the pound 22. The bottom 21 of the pound is further bounded by rope lines 23 which extend outwardly from each end of the side 20 and by rope lines 24 which extend from the outer ends of the sides 23 and join at the outer point 4. The apexes of the bottom frame of the pound are each joined to the top of the main spar, and the points at each side are secured to the pound anchors 25. The sides and bottom of the pound frame are covered by netting, leaving a triangular opening 26 at the front end. The bottom tunnel lines 19.1 extend into the pound and are joined to a short cross spar 26, which is suspended by triangular halters 27 and 28, from the upper and lower ends respectively of the main spar 3. The top lines 1 and 9 are each provided with floats, and the corresponding bottom lines with weights to hold the trap in upright position.

The sides and bottom of the tunnel 28 are enclosed with netting. leaving a triangular opening 29 at the rear which communicates to the interior of the pound 22.

In setting up, the longitudinal frame is stretched to the outer anchor 7 by means of the down-haul 5 which is then locked to the top of the main spar 3. The wing anchors 13 and the side anchors 25 of the pound are then set properly to extend and spread the trap. The side anchor lines are left slack since the weight of the rope in the lines is sufficient to spread the net and slack is thereby provided for allowing the outer end of the net to be lifted when the down-haul 5 is cast off, without disturbing the rest of the fastenings.

A loop 30 is passed around the body of the tunnel at the junction with the pound. In emptying the trap, the lifting tackle in the fishing boat is hooked to the loop 30. The bottom of the net is then lifted, and the fish are driven into the pound. The down-haul 5 is cast off, and allows the outer end of the trap to move inward. The fish are thereby driven into the point 4 which may be opened and a dip-net placed to receive the fish. While the fish are being sorted and removed from the dip-net the end of the pound may be closed and the trap reset by stretching the down-haul and lowering the loop 30.

It is now manifest that the construction of the trap is very simple. The trap is very stable in position and all strains are taken directly by the rope lines. The net is not easily tangled and the emptying process is very simple and may be quickly performed with very little labor.

Although but one specific embodiment of this invention has been herein shown and described, it will be understood that numerous details of the construction shown may be altered or omitted without departing from the spirit of this invention.

I claim:

1. In a floating fish trap, a tunnel having an upright spar in the front end thereof; lead and wing nets converging to a restricted opening in the front end of the tunnel; said nets being spread between the upper and lower ends of said spar and converging to points at the outer ends; a pound at the rear end of the tunnel; and means for spreading said nets, tunnel, and pound.

2. A fish trap comprising a pound of pyramidal form having a central upright spar and having a base net and side nets extending from the rim of the base net to the spar, and lead nets extending to a contracted throat located inward of the pound.

3. A fish trap comprising a pound of pyramidal form having a central upright spar and having a base net and side nets extending from the rim of the base net to the spar, and lead nets extending to a contracted throat located inward of the pound, stays for holding the spar upright and one of said stays having a running part adapted to release the spar and permit the pound to be raised with its contents.

4. A fish trap comprising a pound of pyramidal form having a central upright spar and having a base net and side nets extending from the rim of the base net to the spar, and lead nets including a tunnel, extending to a contracted throat located inward of the pound.

5. A fish trap comprising a pound of pyramidal form having a central upright spar and having a base net and side nets extending from the rim of the base net to the spar, and lead nets including a tunnel, extending to a contracted throat located inward of the pound, and a bridle attached to said tunnel for raising the pound.

GEORGE CLEAVER.